Oct. 13, 1931.　　A. A. GODFREY　　1,827,145
MANUFACTURE OF LINOLEUM
Filed Nov. 2, 1929
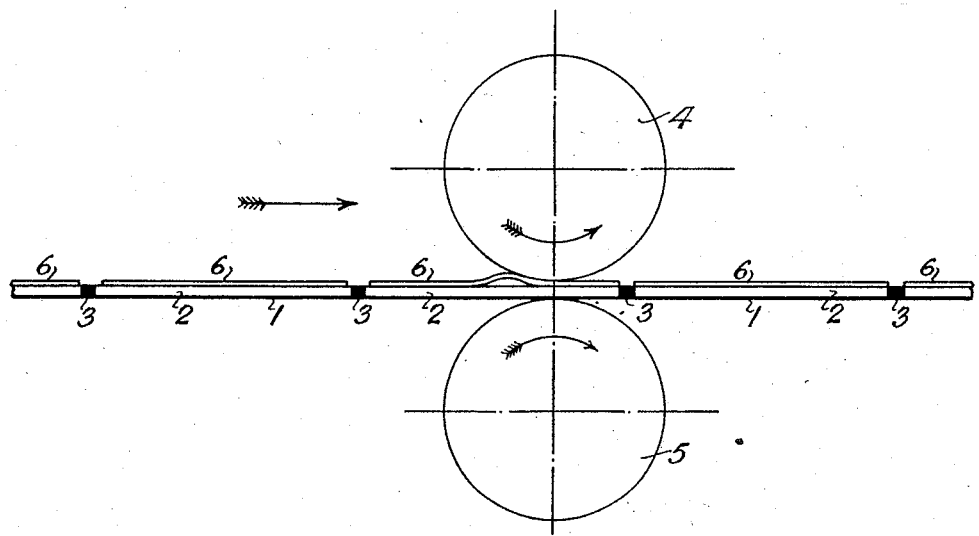
Inventor
Alfred A. Godfrey
By his attorneys,
Burdwin Wight Patented Oct. 13, 1931

1,827,145

UNITED STATES PATENT OFFICE

ALFRED ARTHUR GODFREY, OF LONDON, ENGLAND, ASSIGNOR TO LINOLEUM MANUFACTURING COMPANY, LIMITED, OF LONDON, ENGLAND

MANUFACTURE OF LINOLEUM

Application filed November 2, 1929, Serial No. 404,372, and in Great Britain November 20, 1928.

This invention relates to the manufacture of linoleum having a patterned surface in which the pattern or the background is in relief.

According to the present invention pieces of linoleum to form the pattern and pieces of linoleum to form the background, of the same thickness as those which form the pattern, are placed upon a backing of canvas or other suitable material and rolled or pressed to consolidate them. A second layer of pieces of linoleum to form the pattern (or if desired to form the background) is then superimposed and rolled or pressed to consolidate it with the pieces forming the first layer of pattern. Preferably the pieces forming the second layer are slightly smaller than those of the first layer, so that when they are rolled or pressed, they reach the edges of the pieces forming the background without overlapping them.

The invention is very suitable for forming linoleum known as Dutch tiling, for since the first layer of pieces of linoleum resembling tiles and pieces resembling cement are consolidated by pressing or rolling before the second layer of pieces resembling tiles is superimposed, the second layer need only be pressed or rolled to an extent sufficient to consolidate it with the pieces forming the first layer.

The accompanying drawing shows diagrammatically how the invention may be carried into effect.

1 is a backing of canvas or other suitable material. 2 are pieces of linoleum which form the first layer of a pattern, and 3 are pieces of linoleum which are of the same thickness as the pieces 2 and form the background. After the pieces 2 and 3 have been placed in position, they are rolled or pressed by rolls such as 4, 5 to consolidate them.

Pieces of linoleum 6, forming a second layer of the pattern, are then superimposed on the pieces 2 and rolled or pressed by the rolls 4, 5 to consolidate them with the pieces forming the first layer 2.

In the drawing the backing and pieces of linoleum are passing from left to right. It will be seen that the pieces 6 of the second layer, before passing through the rolls 4 and 5, are smaller than the pieces 2 of the first layer forming the pattern, so that after passing through the rolls 4, 5, the pieces 6 are pressed out to the same size as the pieces 2. It is obvious that the second layer may form a second layer of the background which would thus be in relief.

An important advantage of the present invention is that wear of the linoleum will not lose its tile effect because the blocks or tesserae 3 are of the same depth as the foundation layer.

What I claim is:—

1. The method of manufacturing linoleum having a patterned surface with the pattern in relief or vice versa, which consists in placing pieces of linoleum to form the pattern, and pieces of linoleum to form the background, of the same thickness as those which form the pattern, upon a backing of canvas or other suitable material, rolling or pressing the said pieces forming the pattern and the background to consolidate them, superimposing a second layer of pieces of linoleum to form a portion in relief and rolling or pressing it to consolidate it with the pieces forming the first layer.

2. The method of manufacturing linoleum as claimed in claim 1, in which the pieces forming the second layer are slightly smaller than those of the first layer to enable such compression as is necessary to consolidation.

3. The method of manufacturing linoleum consisting in consolidating a multiplicity of initially separate pieces of linoleum to form the pattern and a multiplicity of initially separate pieces of linoleum to form the background, and in consolidating individual pieces of linoleum in superposed relation with one of said multiplicities of pieces to provide a portion in relief with respect to the other multiplicity of pieces.

In testimony that I claim the foregoing as my invention I have signed my name this third day of October, 1929.

ALFRED ARTHUR GODFREY.